Figure 1:
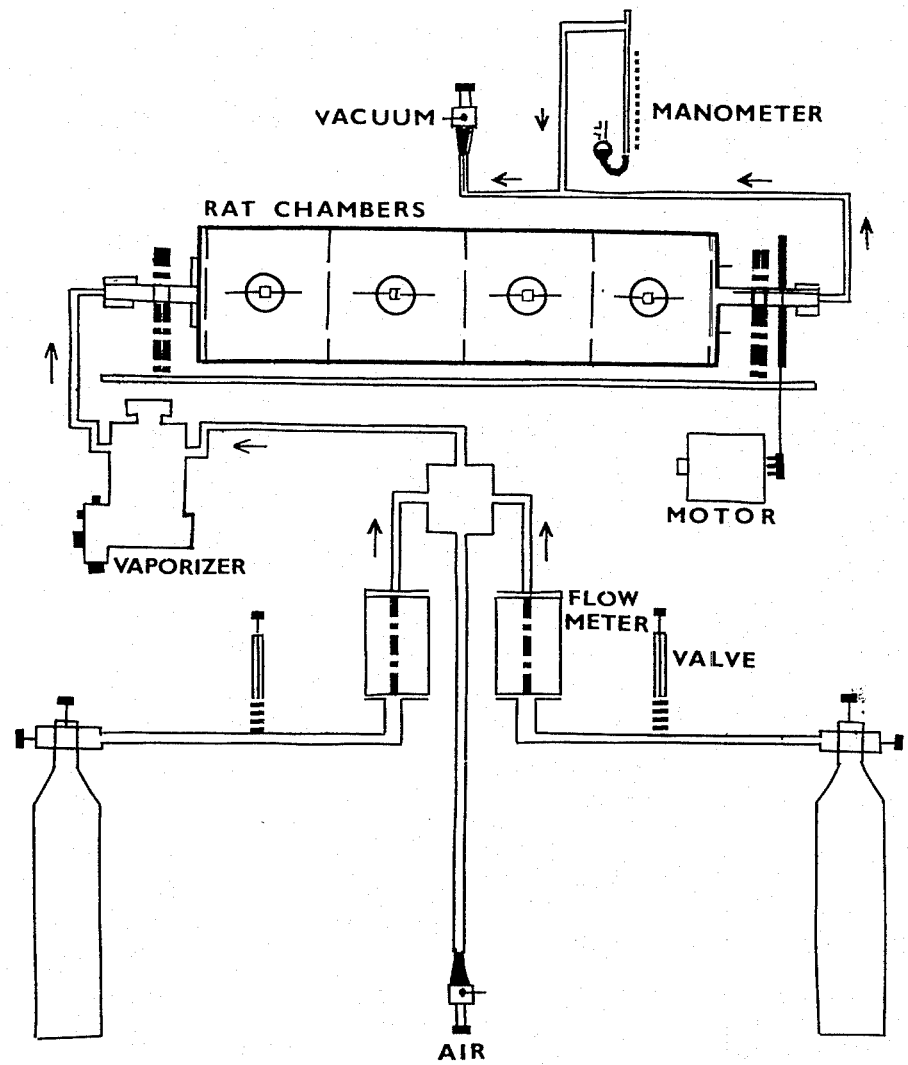
Figure 2:
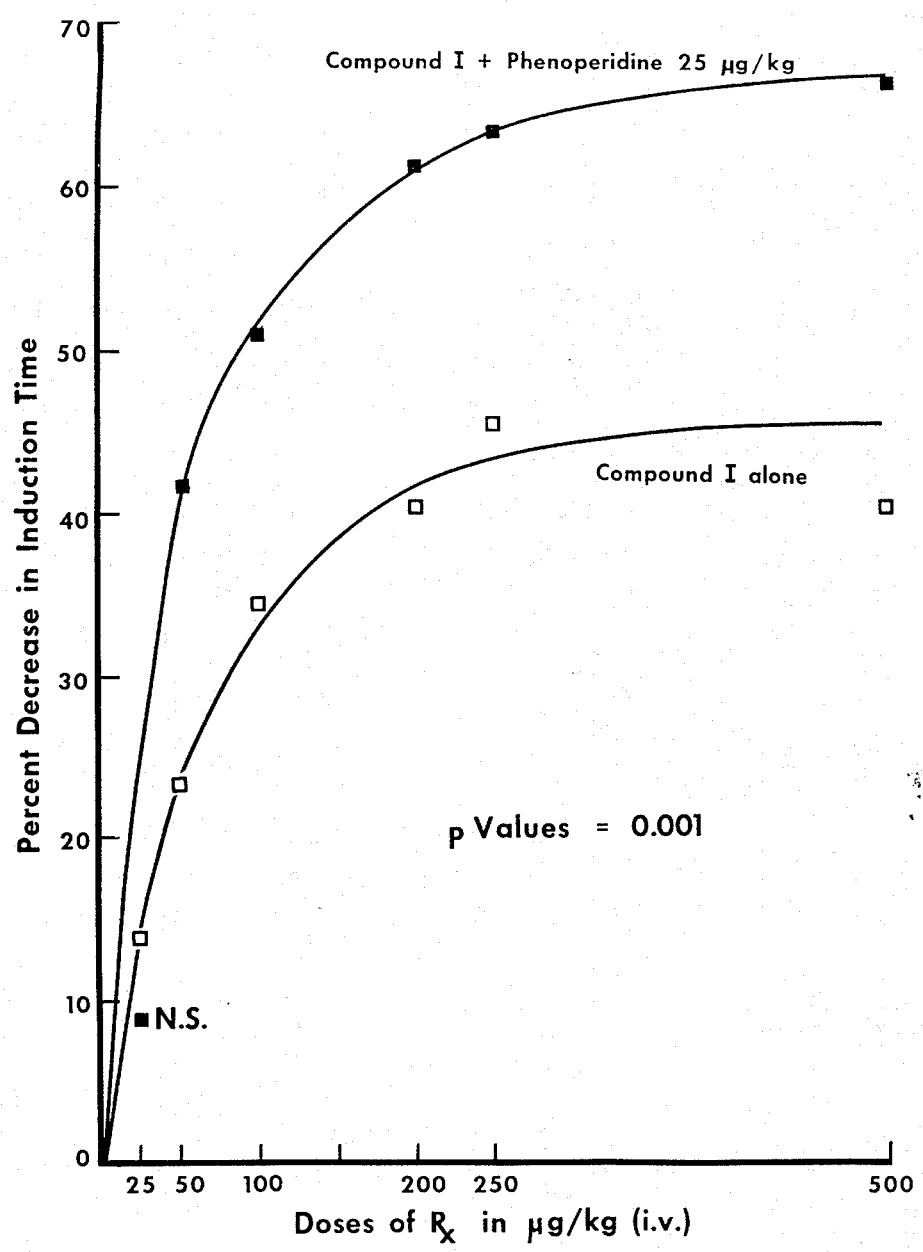
Figure 3:
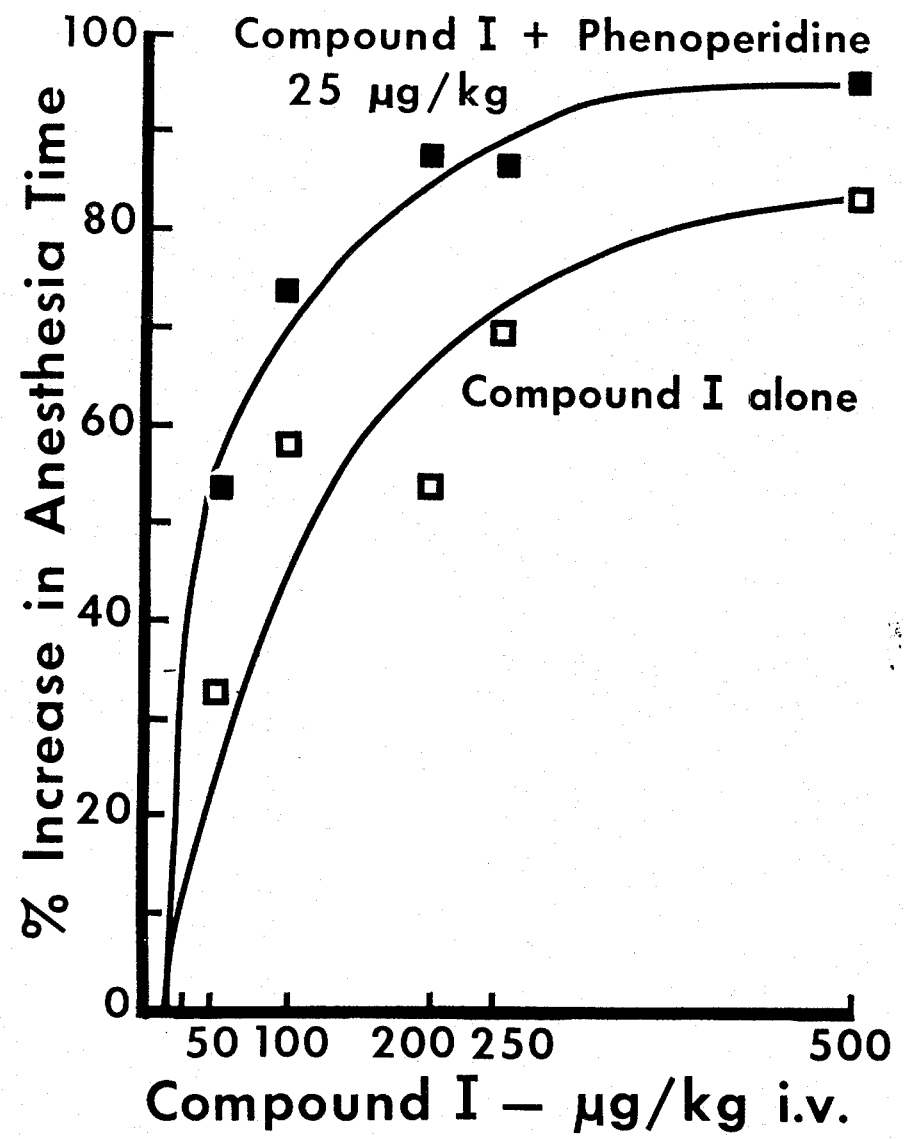
Figure 4:
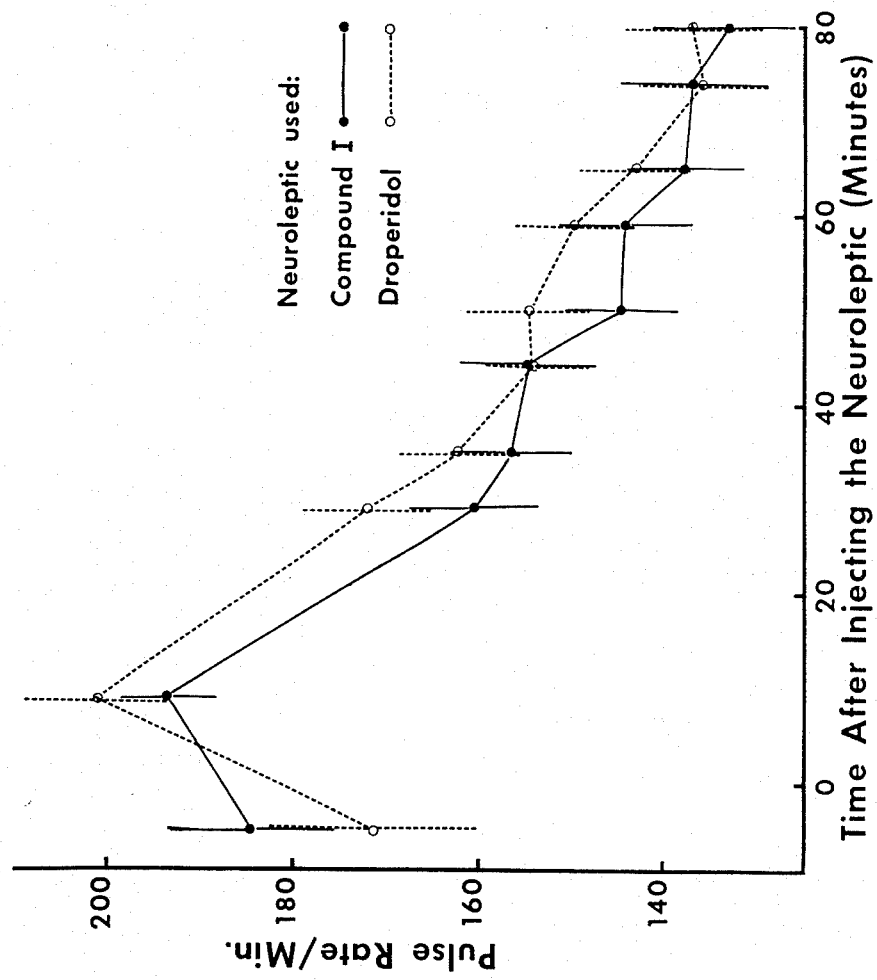
Figure 5:
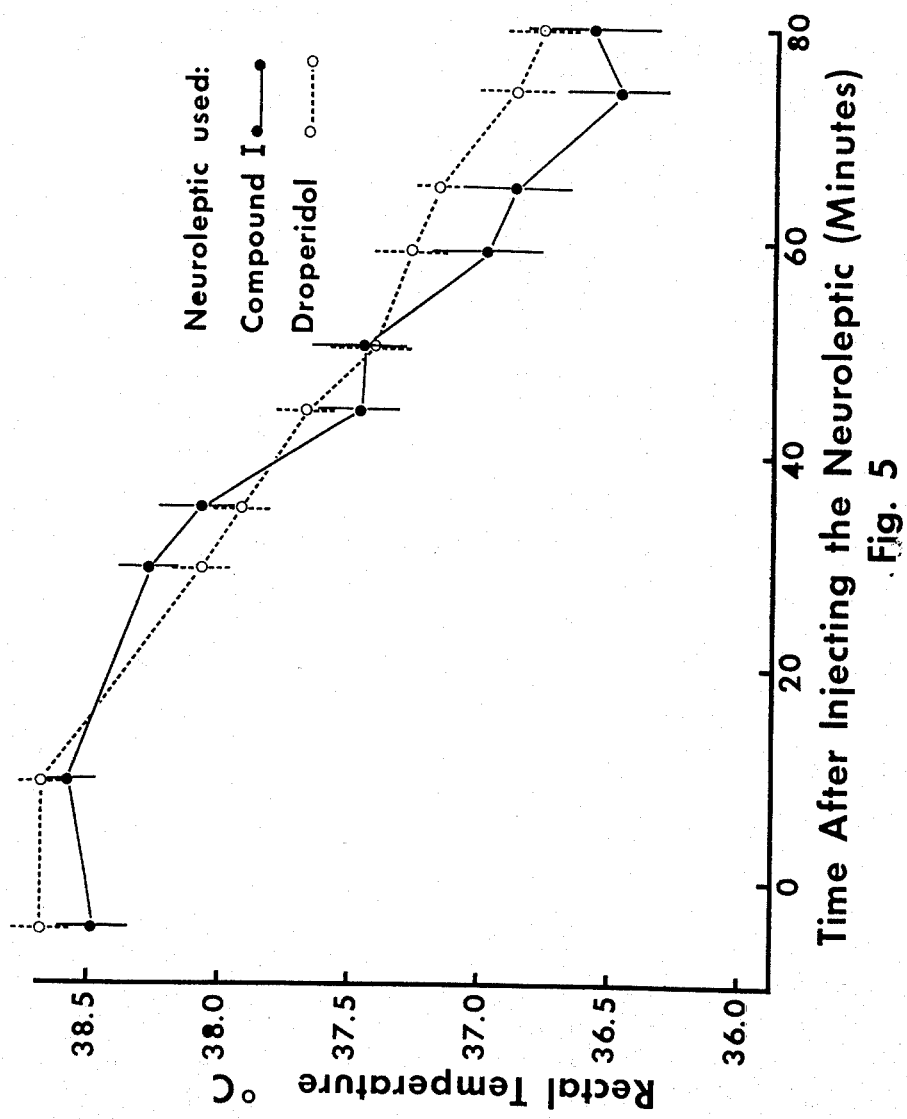

United States Patent [19]

Gutridge

[11] 4,053,694

[45] Oct. 11, 1977

[54] NICKEL ACTIVATION BATTERY COMPONENT

[75] Inventor: Ian P. Gutridge, Brierley Hill, Staffs, England

[73] Assignee: The International Nickel Company, Inc., New York, N.Y.

[21] Appl. No.: 699,055

[22] Filed: June 23, 1976

Related U.S. Application Data

[62] Division of Ser. No. 520,258, Nov. 4, 1974, Pat. No. 3,997,364.

[30] Foreign Application Priority Data

Nov. 13, 1973 United Kingdom ............... 52658/73

[51] Int. Cl.$^2$ ............................................. H01M 4/32
[52] U.S. Cl. ..................................................... 429/223
[58] Field of Search ................ 429/223; 427/126, 201, 427/202, 205, 318, 402, 405; 204/27, 56 R, 96, 42

[56] References Cited

U.S. PATENT DOCUMENTS

| | | | |
|---|---|---|---|
| 3,214,355 | 10/1965 | Kandler | 429/235 X |
| 3,852,112 | 12/1974 | Turner et al. | 429/223 X |
| 3,911,094 | 10/1975 | Megahed et al. | 429/223 X |

Primary Examiner—C. F. LeFevour
Attorney, Agent, or Firm—Francis J. Mulligan, Jr.; Ewan C. MacQueen

[57] ABSTRACT

A process for activation of foil or sheet substrate to render it suitable for electrochemical use comprising first anodically treating the impervious substrate in an aqueous ammonical solution of nickel nitrate and thereafter cathodically treating the thus anodically treated substrate in an aqueous acid electrolyte containing nickel ions and reducible ions, the redox potential of which is more positive than the discharge potential of nickel ions.

3 Claims, No Drawings

Testing Apparatus

NICKEL ACTIVATION BATTERY COMPONENT

This is a division, of application Ser. No. 520,258, filed Nov. 4, 1974 now U.S. Pat. No. 3,997,364.

The present invention relates to the activation of impervious nickel foil or sheet in order to render it suitable for use as an electrode in an alkaline accummulator (i.e., storage battery).

Nickel electrodes for use in alkaline acummulators consist of nickel active mass supported on an electrically conductive substrate. In order to obtain acummulators having high energy densities, it is essential to develop the activation process so as to enable active mass of a suitable form and in suitable amounts to be present at the nickel electrode. Two important criteria in this context are the density of the active mass and its utilization, i.e., the proportion of the active mass present which actually takes part in the oxidation/reduction reaction during use of the acummulator.

A known process for forming nickel active mass is described and claimed in U.K. patent 917,291 and in U.S. Pat. No. 3,214,355. This process, often referred to as Kandler process, is essentially an impregnation process in that it involves the use of a porous substrate and deposition of active mass within the pores of the substrate. Thus in order to form nickel active mass by the process of U.K. Pat. No. 917,291, a porous electrically conductive substrate is cathodically treated in an electrolyte containing nickel ions and reducible ions the redox potential of which is more positive than the discharge potential of the nickel ions. It is essential to use a porous substrate for this process (e.g., a porous sintered nickel plaque) since the deposit, which is green nickel hydroxide, $Ni(OH)_2$, would not adhere to a smooth substrate such as a sheet or foil.

A process which enables the activation of nickel foil or sheet is described and claimed in U.S. Pat. No. 3,579,383 and more particularly in U.K. Pat. No. 1,240,445. This process consists of forming a black deposit of beta nickel hydrate on the foil or sheet by anodic treatment in an aqueous electrolyte containing a nickel ammine complex. The electrolyte is formed by adding ammonia to an aqueous solution of nickel nitrate and ammonium nitrate. The electrolyte concentration is such that the ratio of ammonia to nickel (gram/-molecules to gram/ions) is from 0.1 to 3, and the ratio of the molar concentration of the ammonium nitrate to that of the nickel nitrate is at least 0.1:1 but not exceeding 3:1. The anodic treatment is carried out with a current density on the foil or sheet of 0.1 to 1000mA/cm$^2$. While the process enables electrodes to be made using foil substrates, which are preferred to sintered substrates in view of their greater strength as well as conductivity and their lower volume, a limitation of the process is the difficulty in achieving high densities of the deposited active mass.

It is an object of the present invention to provide a process which is operable to activate impervious electroconductive substrates to provide storage battery electrodes having active material deposits of higher energy density than have heretofor been obtainable. It is another object of the invention to provide a novel battery component.

Other objects and advantages will become apparent from the following description.

It has now been surprisingly found that an impervious nickel sheet or foil which has been subjected to the above-mentioned anodic treatment to form a black deposits of beta nickel hydrate thereon, is suitable for us as a "porous structure" which can be cathodically treated according to the Kandler process without dislodging the original deposit. When this is done it has been found that green nickel hydroxide is deposited within the pores of the black beta nickel hydrate, resulting in active mass of greater bulk density than would be achieved by the use of the above-mentioned anodic process alone. Moreover while the impregnation of the beta nickel hydrate with nickel hydroxide leads to a decrease in utilisation, it has been found that the process conditions can be defined such that the latter is more than offset by the density increase so that there is an overall improvement in the energy density of the active mass.

According to the invention a process for activating a nickel foil or sheet substrate comprises anodically treating the substrate, at an anodic current density of 0.10 – 1000mA/cm$^2$, in an aqueous electrolyte which is formed by the addition of ammonia to an aqueous solution of nickel nitrate and ammonium nitrate and in which the ratio of ammonia to nickel (gram molecules to gram ions) is from 0.1 to 1 to 3 to 1 and the ratio of the molar concentration of ammonium nitrate to the molar concentration of nickel nitrate is from 0.1 to 1 to 3 to 1, and thereafter cathodically treating the substrate in an acid electrolyte containing nickel ions and reducible ions the redox potential of which is more positive than the discharge potential of nickel ions.

In the first stage of the process (i.e., the anodic treatment) the current density used is preferably from 10 to 50mA/cm$^2$, and while concentrations of $Ni(NO_3)_2 6H_2O$ of between 100 grams per liter (0.34 molar) and the saturation point are preferred, it is particularly advantageous to use concentrations from about 375 to about 500 grams per liter (1.3 to 1.7 molar). The most advantageous value for the ratio of ammonia to nickel (gram moles to gram ions) is approximately from 2.6 to 1 to 2.9 to 1 for example 2.75 to 1.

With regard to the second stage of the process (i.e., the cathodic treatment), particularly preferred reducible ions are nitrate ions but any alternative ions having a high, positive redox potential, for example chromate, chlorate and permanganate ions, can also be employed. It is to be noted that the ions having a high, positive redox potential are reduced under the cathodic conditions of the invention without deposition of a metallic or hydroxidic product derived from that ion. In the second stage of the present process nickel hydroxide is the deposited product.

In the case of nitrate anions, the current density used is preferably from 0.1 to 1000 mA/cm$^2$ and most preferably from 1 to 20mA/cm$^2$. The nitrate ion concentration should be between 0.1 molar and the saturation point and is most advantageously about 0.6 to about 3 molar. The pH of the electrolyte is preferably from 0.5 to 7 and is most preferably from 1.5 to 4.0.

The optimum conditions in the case of anions alternative to nitrate ions may differ from those for nitrate ions and may vary from ion to ion but they can be readily determined.

The invention will now be further described with reference to particular examples of processes according to the invention.

Six specimens of nickel foil were activated as follows. Each of the specimens was a square foil measuring 5 cm × 5 cm and having a thickness of four microns. Each specimen was anodically treated in a solution of 1.5 molar nickel nitrate hexahydrate, 3.0 molar ammonium nitrate and 4.1 molar ammonia. The solution temperature was maintained at 35° C and the treatment continued for 45 minutes at an anode current density of 25mA/cm$^2$.

In each case the above-mentioned anodic treatment resulted in the deposition of approximately 100mg of black nickel hydrate having a bulk density of approximately 1.0g/cc.

In accordance with the process of the present invention, each of the specimens was then subjected to a second stage of activation by immersing the coated foil in an acidic nickel nitrate solution and making the specimen cathodic. The acidity of the solution was controlled by addition of nitric acid or ammonia to give solutions of pH 1.5 or 3.0. The solution concentration was either 0.75 molar or 1.0 molar nickel nitrate hexahydrate. Table I lists the experimental conditions for the second stage of the activation process for each of the six specimens.

After activation of the foils, the total weight of the active mass deposited thereon was determined, as well as the bulk density of this active mass. Furthermore by determining the electrical capacity of the activated foils, the utilization of the active mass, i.e., the ratio of the weight of active mass contributing to the electrical capacity of the activated plate to the total weight of active mass present, was determined from a comparison of the capacity of the activate foil (in Ah/g of active mass) with the theoretical capacity of nickel hydroxide. The resulting data is shown in the last three columns of Table I.

utilization of the active mass is more than offset by the increase in the density of the active mass. This is illustrated by considering the capacity per unit volume of active mass for each of the activated foils referred to above.

The capacity, in ampere hours, of 1cc of active mass is given by the expression:

$$C_v = C_t \times u \times d$$

where
   $C_v$ = capacity per unit volume of active mass
   $C_t$ = the theoretical capacity per gram of nickel hydroxide = 0.289Ah/g
   $u$ = the coefficient of utilization of active mass
   $d$ = bulk density of the active mass in g/cc.

It will therefore be seen that the capacity of unit volume of active mass is directly proportional to the product $u \times d$. Table II below shows the value of this product for each of the six specimens activated in accordance with the present invention as well as for the comparative specimen, A, activated by a single stage anodic treatment.

TABLE II

| Specimen | u × d |
|---|---|
| A | 0.95 |
| 1 | 1.46 |
| 2 | 1.54 |
| 3 | 1.44 |
| 4 | 1.50 |
| 5 | 1.37 |
| 6 | 1.41 |

A further illustration of the benefits of the activation process in accordance with the invention may be obtained

TABLE I

| Specimen | Concentration of Solution Ni(NO$_3$)$_2$OH$_2$O | pH[1] | Current Density | Time | Temp. | Final Wt. of Active Mass | Final Density of Active Mass | Utilization of Active Mass on 1st Discharge |
|---|---|---|---|---|---|---|---|---|
| 1 | 0.75 M | 3.0 | 6mA/cm$^2$ | 25 min. | 35° C | 240 mg | 1.7 g/cc | 0.85 |
| 2 | 0.75 M | 1.5 | 6mA/cm$^2$ | 60 min. | 30° C | 320 mg | 2.0 g/cc | 0.77 |
| 3 | 1.0 M | 1.5 | 6mA/cm$^2$ | 60 min. | 30° C | 290 mg | 1.8 g/cc | 0.80 |
| 4 | 1.0 M | 3.0 | 6mA/cm$^2$ | 45 min. | 30° C. | 280 mg | 1.8 g/cc | 0.78 |
| 5 | 1.0 M | 3.0 | 6mA/cm$^2$ | 60 min. | 30° C | 310 mg | 1.9 g/cc | 0.72 |
| 6 | 0.75 M | 1.5 | 6mA/cm$^2$ | 60 min. | 40° C | 370 mg | 2.1 g/cc | 0.67 |

[1]Adjusted by addition of nitric acid or ammonia.

From a theoretical standpoint, it will be appreciated that an increase in the density of the active mass brought about by deposition of nickel hydroxide within the pores of the beta nickel hydrate would be expected to lead to a decrease in the utilization of the active mass in view of the decrease in accessibility of the active mass to the electrolyte used in the capacity measurement (and indeed to the electrolyte used in the acumulator of which the activated foil constitutes an electrode). This expected decrease in utilization was in fact confirmed by the results of the present investigation. For the purpose of comparison a seventh specimen (specimen A) was anodically treated in the same manner as the specimens 1 to 6 but was not subjected to the second (cathodic) stage of the process. The active mass produced in this way i.e., not according to the present invention but according to the process of U.K. Pat. No. 1,240,445, was found to exhibit a utilization of 0.95 which is higher than the utilization of active mass exhibited by any of the specimens of Table I.

The benefit derived from the process of the present invention, as opposed to the process of U.K. patent 1,240,445, arises from the fact that as a result of performing the second stage of activation the decrease in tained by considering the capacity per unit weight of "loaded active mass," i.e., active mass with electrolyte filling the pores thereof. This capacity $C_w$ can be evaluated from the measured coefficient of utilisation, $u$, bulk density of the active mass, $d$, as well as the theoretical capacity of nickel hydroxide, $C_t$, the theoretical density of nickel hydroxide, $d_t$, and the density of the electrolyte, $d_e$ by means of the following equation:

$$C_w = \frac{C_t \times u}{1 + (\frac{1}{d} - \frac{1}{d_t})d_e}$$

The calculated values for the capacity per unit weight of loaded active mass for each of the six specimens activated according to the invention, as well as for the comparative specimen A are shown in Table III.

TABLE III

| Specimen | C$_w$ |
|---|---|
| A | 0.145 |
| 1 | 0.174 |
| 2 | 0.172 |
| 3 | 0.169 |
| 4 | 0.164 |

TABLE III-continued

| Specimen | $C_w$ |
|---|---|
| 5 | 0.156 |
| 6 | 0.153 |

It will therefore be seen from the above that all of the specimens activated in accordance with the present invention exhibited higher values of both $C_v$ and $C_w$ than the comparative specimen A which was activated by a single anodic treatment.

The present invention also contemplates the product of the process activation which in the as-activated condition as exemplified by specimens 1 to 6, comprises an impervious electrically conductive substrate having on the surface thereof an adherent black deposit of beta nickel hydrate and having positioned in the pores of the beta nickel hydrate a deposit of green nickel hydroxide. The total weight of the active material on the electrically conductive substrate is usually about 5 to about 20 milligrams (mg) per square centimeter of substrate area. The electrically conductive substrate is advantageously thin nickel foil or sheet of a thickness of about 0.0004 to about 0.005 centimeter which is impervious in the sense that it does not contain internal pores such as present in a sintered metal plaque. However, the foil or sheet may be perforated in a geometric pattern so that when it contains active material the perforated activated foil can be assembled into battery plates such as described and claimed in U.S. Pat. No. 3,785,867.

While the invention has been described in terms of employing nickel as the electroconductive substrate, those skilled in the art will appreciate that other materials inert during activation and inert in battery usage can be employed. For example, titanium, taptalum, platinum and stainless steel have been mentioned in U.S. Pat. No. 3,725,129 as equivalent to nickel, albeit not preferred, for use as a base for a nickel hydroxide electrode. Such equivalents and others are intended to be included within the term "nickel".

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. As a battery component, an impervious electrically conductive nickel substrate having on the surface thereof in the as activated condition an adherent black deposit of porous beta nickel hydrate and having positioned in the pores of the beta nickel hydrate a deposit of green nickel hydroxide.

2. A battery component as in claim 1 wherein the impervious electrically conductive nickel substrate is nickel foil or sheet.

3. A battery component as in claim 1 wherein the beta nickel hydrate and nickel hydroxide together are present in an amount of about 5 to about 20 milligrams per square centimeter of substrate area.

* * * * *